US012326233B2

(12) United States Patent
Baker et al.

(10) Patent No.: US 12,326,233 B2
(45) Date of Patent: Jun. 10, 2025

(54) LIGHT APPARATUS

(71) Applicant: Rivian IP Holdings, LLC, Plymouth, MI (US)

(72) Inventors: Simon Baker, Basingstoke (GB); Vijay Jayaraman, Irvine, CA (US); Amadeus Alfredo Ortega Quezada, Irvine, CA (US); Saili Dilip Jagtap, White Lake, MI (US); Diana Betzabe Cuellar Alcala, Irvine, CA (US); Luis Guillermo Sagastume Pelaez, Fountain Valley, CA (US); Michael Max Schur, West Islip, NY (US); Jonathan James Szczupak, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/148,188

(22) Filed: Dec. 29, 2022

(65) Prior Publication Data

US 2024/0218998 A1 Jul. 4, 2024

(51) Int. Cl.

| | |
|---|---|
| ***F21S 43/19*** | (2018.01) |
| ***F21S 43/14*** | (2018.01) |
| ***F21S 43/20*** | (2018.01) |
| ***F21S 43/31*** | (2018.01) |
| ***F21W 103/55*** | (2018.01) |
| ***G08B 5/36*** | (2006.01) |

(52) U.S. Cl.

CPC ............... *F21S 43/19* (2018.01); *F21S 43/26* (2018.01); *F21S 43/31* (2018.01); *F21S 43/14* (2018.01); *F21W 2103/55* (2018.01); *G08B 5/36* (2013.01)

(58) Field of Classification Search

CPC .. F21S 43/19; F21S 43/31; F21S 43/26; F21S 43/14

See application file for complete search history.

(56) References Cited

U.S. PATENT DOCUMENTS

| | | | | |
|---|---|---|---|---|
| 8,322,902 | B2 | 12/2012 | Martin et al. | |
| 8,789,991 | B2 | 7/2014 | Martin et al. | |
| 9,121,566 | B2 | 9/2015 | De Lamberterie | |
| 9,457,707 | B2 * | 10/2016 | Nantais | F21S 43/40 |
| 10,458,617 | B2 * | 10/2019 | Hanulak | F21S 43/249 |
| 10,543,879 | B2 * | 1/2020 | Kuriki | F21S 43/50 |
| 11,110,856 | B2 * | 9/2021 | Sugimoto | B60Q 1/0011 |
| 2013/0242586 | A1 * | 9/2013 | Huizen | F21S 43/249 362/494 |

(Continued)

FOREIGN PATENT DOCUMENTS

| | | |
|---|---|---|
| EP | 2 098 774 A1 | 9/2009 |
| EP | 2 161 494 B1 | 11/2011 |

(Continued)

OTHER PUBLICATIONS

Screenshot of "Tesla X-treme taillights for model Y and 3", i1Tesla, youtube.com, Jul. 25, 2022, https://www.youtube.com/watch?v=mUxDVMnxmUc (Year: 2022).*

*Primary Examiner* — Matthew J. Peerce
(74) *Attorney, Agent, or Firm* — Foley & Lardner LLP

(57) ABSTRACT

An apparatus can include a first light bar that includes a first light guide that can reflect a first light from a first source. The apparatus can include a second light bar that includes a second light guide that can reflect a second light from a second source. The first light bar can couple with the second light bar.

15 Claims, 16 Drawing Sheets

(56) References Cited

U.S. PATENT DOCUMENTS

| | | | | |
|---|---|---|---|---|
| 2014/0160779 | A1* | 6/2014 | Pusch | F21S 43/50<br>362/511 |
| 2014/0169016 | A1* | 6/2014 | Kirchner | F21S 43/239<br>362/511 |
| 2014/0253306 | A1* | 9/2014 | Gillespey | B60L 53/14<br>340/425.5 |
| 2016/0195230 | A1* | 7/2016 | Grosdidier | F21S 41/151<br>362/511 |
| 2017/0240060 | A1* | 8/2017 | Roberts | B60Q 1/0076 |
| 2018/0065544 | A1* | 3/2018 | Brusco | B60L 1/14 |
| 2022/0149019 | A1* | 5/2022 | Brandl | B60Q 1/28 |

FOREIGN PATENT DOCUMENTS

| | | |
|---|---|---|
| EP | 2 792 940 B1 | 9/2016 |
| EP | 2 098 774 B1 | 7/2020 |
| FR | 2928110 | 6/2010 |
| JP | 5405151 B | 2/2014 |

* cited by examiner

LIGHT APPARATUS

INTRODUCTION

A vehicle can include various lighting components. Some lighting components can provide various functions for a vehicle.

SUMMARY

A vehicle can include an apparatus that can display various lights. For example, the apparatus can include at least one section that can display a segmented charge status of a battery of a vehicle. For example, the light displaying the charge status of the vehicle can include one or more various colors, such as green, and can be segmented to visually demonstrate the charge status. The segmentation can clearly show the battery charge level and can prevent unclear color bleeding of the light. The apparatus can include one or more additional sections. For example, the apparatus can include at least one section that can display a daytime light or position light for a vehicle.

At least one aspect is directed to an apparatus. The apparatus can include a first section that includes a first light guide that can reflect a first light from a first source. The apparatus can include a second section that includes a second light guide that can reflect a second light from a second source. The first section can couple with the second section.

At least one aspect is directed to a method. The method can include displaying a first light from a first source via a first light guide. The method can include displaying a second light from a second source via a second light guide. The first light guide can guide the first light from the first source and the second light guide can guide the second light from the second source.

At least one aspect is directed to an electric vehicle. The electric vehicle can include an apparatus. The apparatus can include a first section that can display a first light from a first source to a first light guide. The first light guide can reflect the first light from the first source. The apparatus can include a second section that can display a second light from a second source to a second light guide. The second light guide can reflect the second light from the second source.

At least one aspect is directed to a method. The method can include providing an apparatus. The apparatus can include a first section that can display a first light from a first source to a first light guide. The first light guide can reflect the first light from the first source. The apparatus can include a second section that can display a second light from a second source to a second light guide. The second light guide can reflect the second light from the second source.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of providing multi-function lights in vehicles or other systems. The various concepts introduced above and discussed in greater detail below may be implemented in any of numerous ways.

The present disclosure is directed to systems and methods of a multi-function lighting apparatus for a vehicle. The multi-function lighting apparatus can function as or can be positioned on a center lamp. The lighting apparatus can be positioned on a front of the vehicle, a rear of the vehicle, a side of the vehicle, a top or the vehicle, a bottom of the vehicle, a door of the vehicle, a windshield of the vehicle, or another portion of the vehicle. The apparatus can include a first section (e.g., an upper section) that can display light from a first source (e.g., one or more LEDs) and a second section (e.g., a lower section) that can display light from a second source (e.g., one or more LEDs). The light sources can include or can be coupled with one or more printed circuit boards operably coupled with the first and second sections. For example, the apparatus can include a printed circuit board having the first source positioned on a first surface (e.g., a top surface) of the printed circuit board such that the first light source projects light in a first direction.

The printed circuit board can include the second source positioned on a second opposing surface (e.g., a bottom surface) such that the second light source projects light in a second direction. A first reflector can reflect the light from the first source through a portion of the first section (e.g., through one or more transparent or translucent materials). A second reflector can reflect the light from the second source through a portion of the second section (e.g., through one or more transparent or translucent materials). The first section can display a first function related to the vehicle (e.g., a daytime running light or a position light) and the second section can be segmented to display a second function related to the vehicle (e.g., a charge status of a battery of the vehicle).

The disclosed solutions have a technical advantage of providing at least two functions of light through one apparatus. The disclosed solutions provide a segmented light to display charge status of a vehicle battery, which allows for a clear, identifiable visual state of charge status of a vehicle as compared to conventional technologies, which may only include a continuous color or light. Further, the disclosed solutions provide at least two distinct vehicle functions (e.g., daytime running light, position light, charge status) through one apparatus without having the functions bleed into one another.

Figure 1:
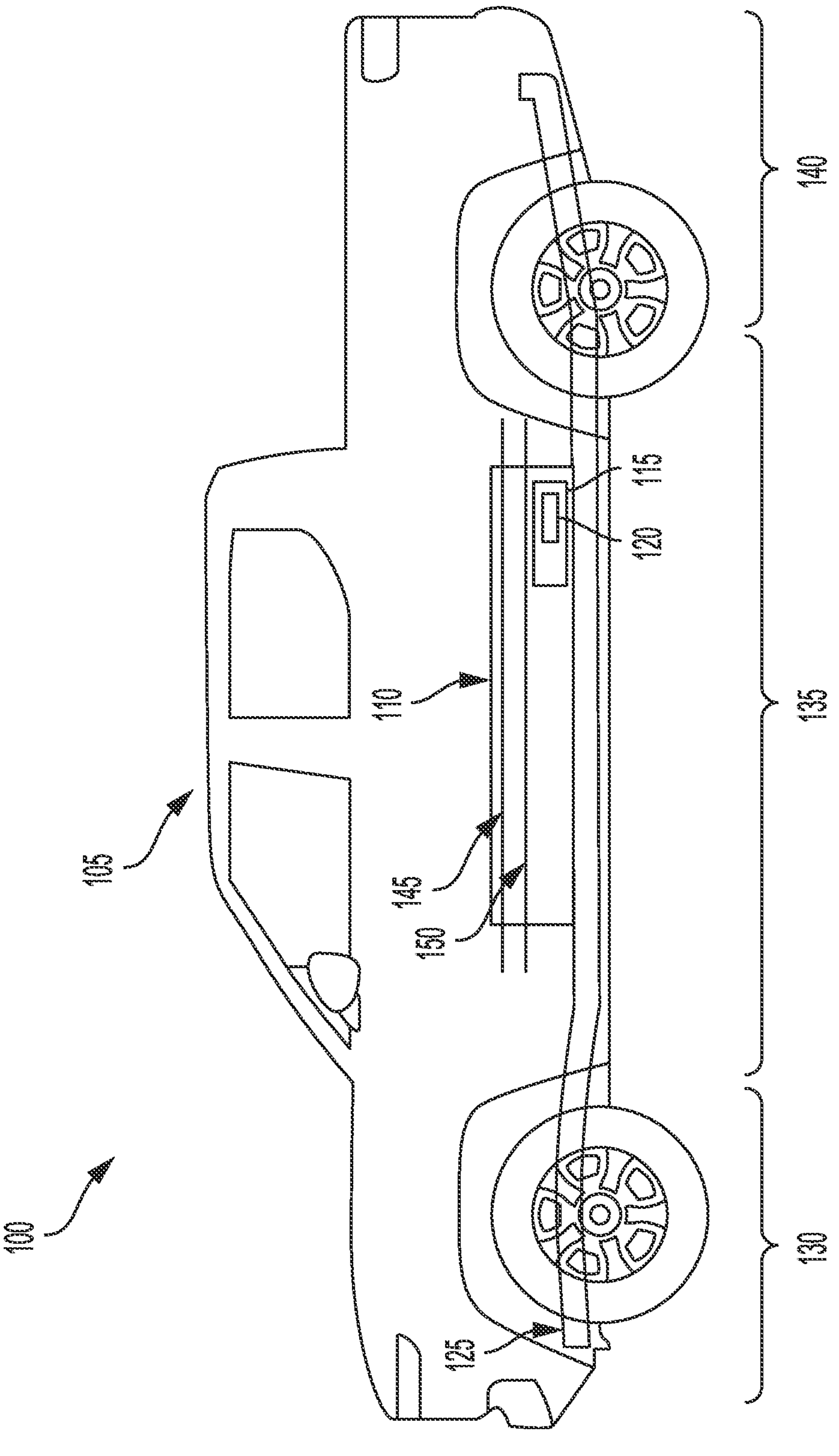
FIG. 1 depicts an example side view of an electric vehicle, in accordance with implementations.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
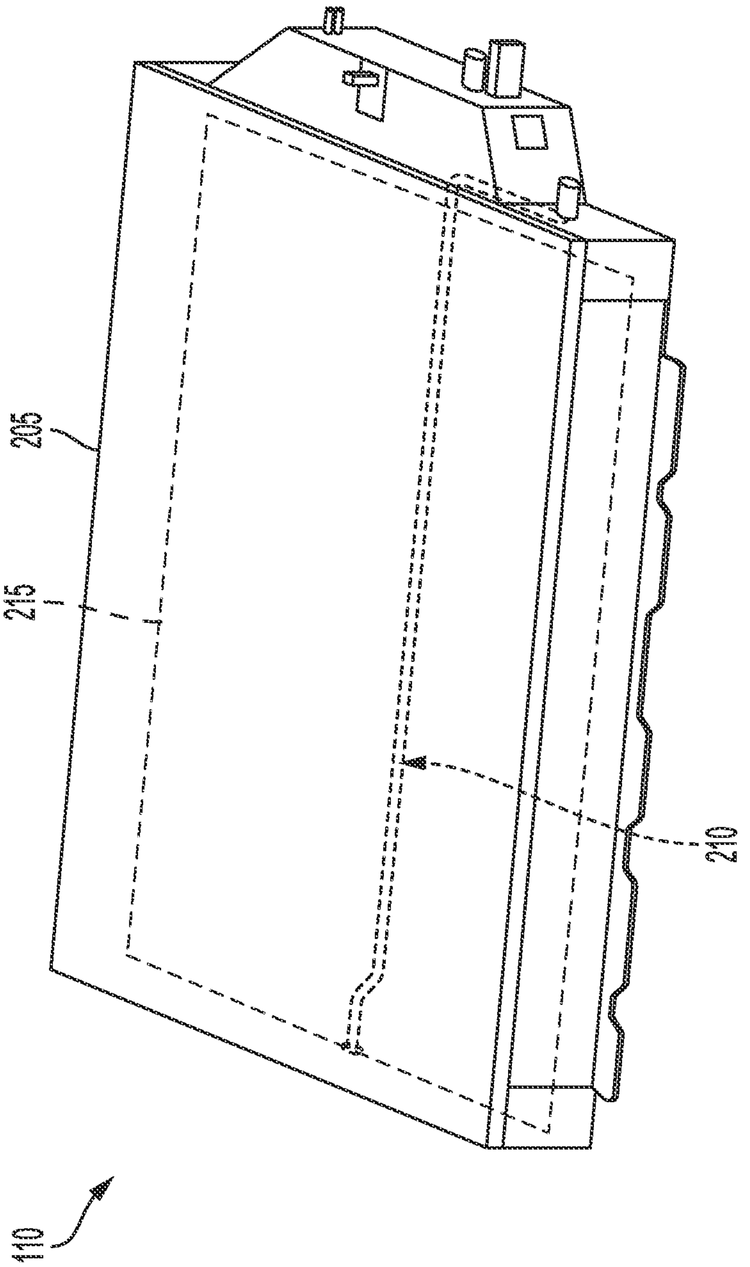
FIG. 2A depicts an example perspective view of a battery pack, in accordance with implementations.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
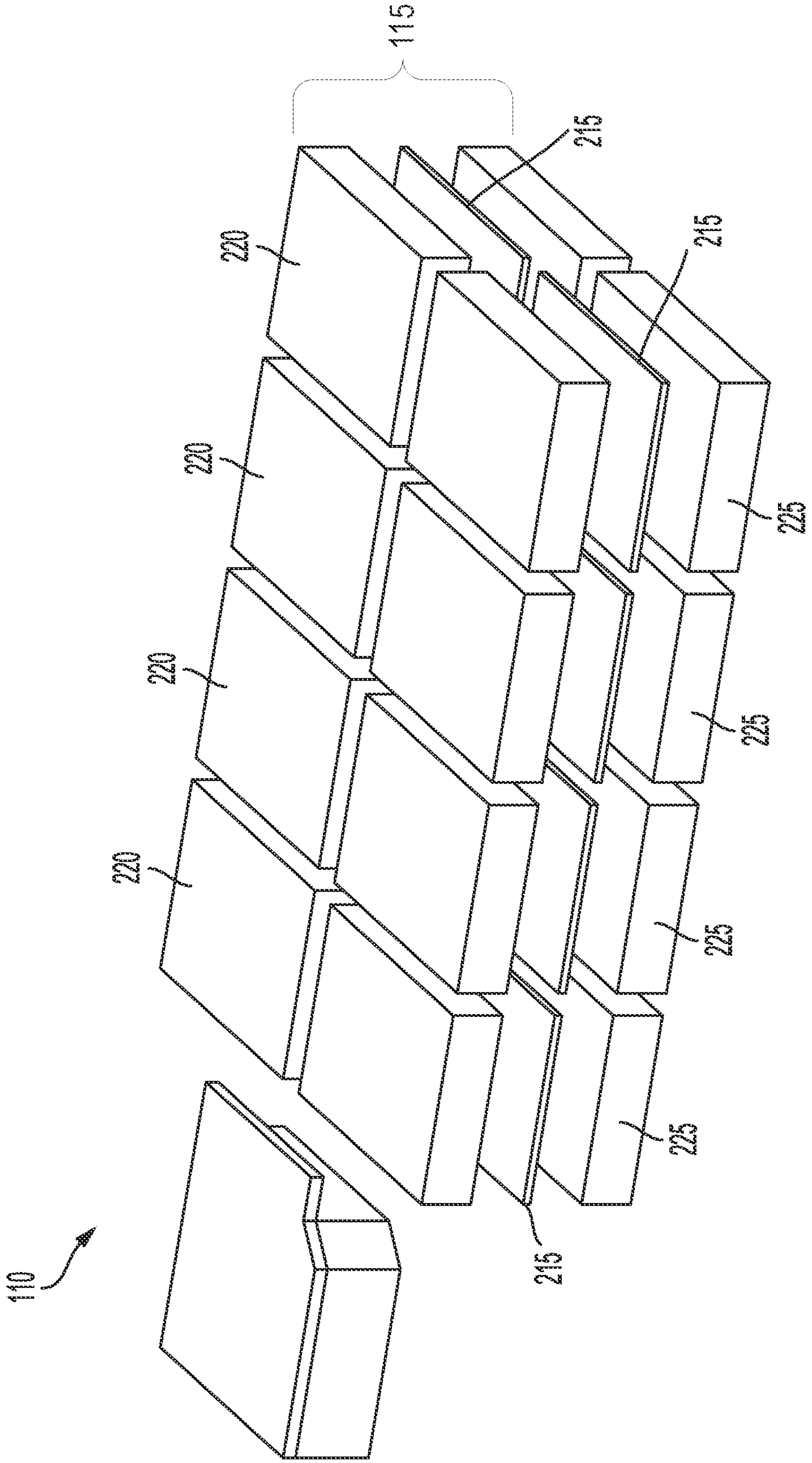
FIG. 2B depicts an example perspective view of a battery module, in accordance with implementations.
Figure 2C:
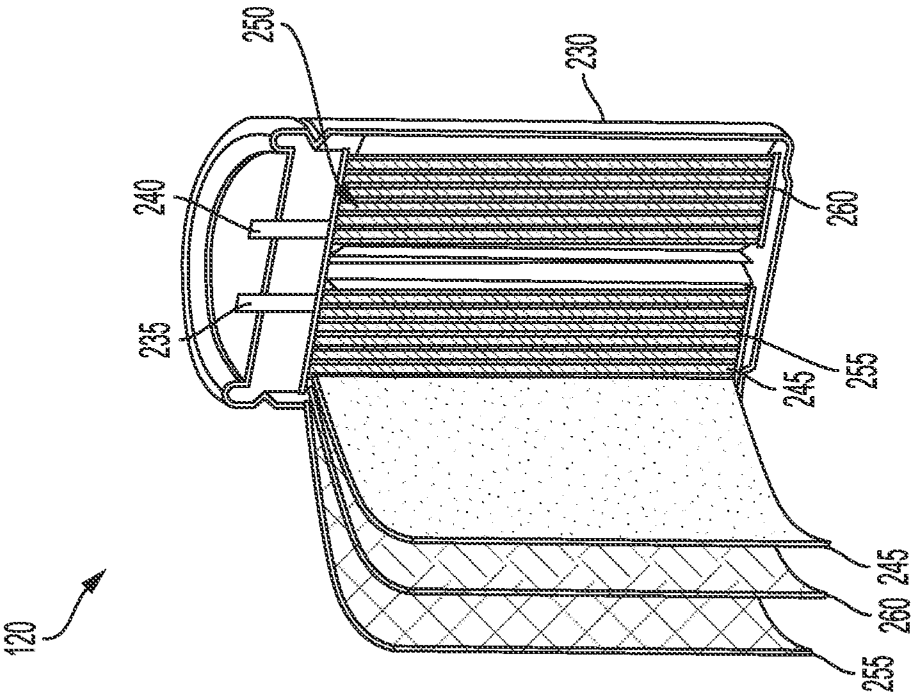
FIG. 2C depicts an example perspective view of a battery cell, in accordance with implementations.
Figure 2D:
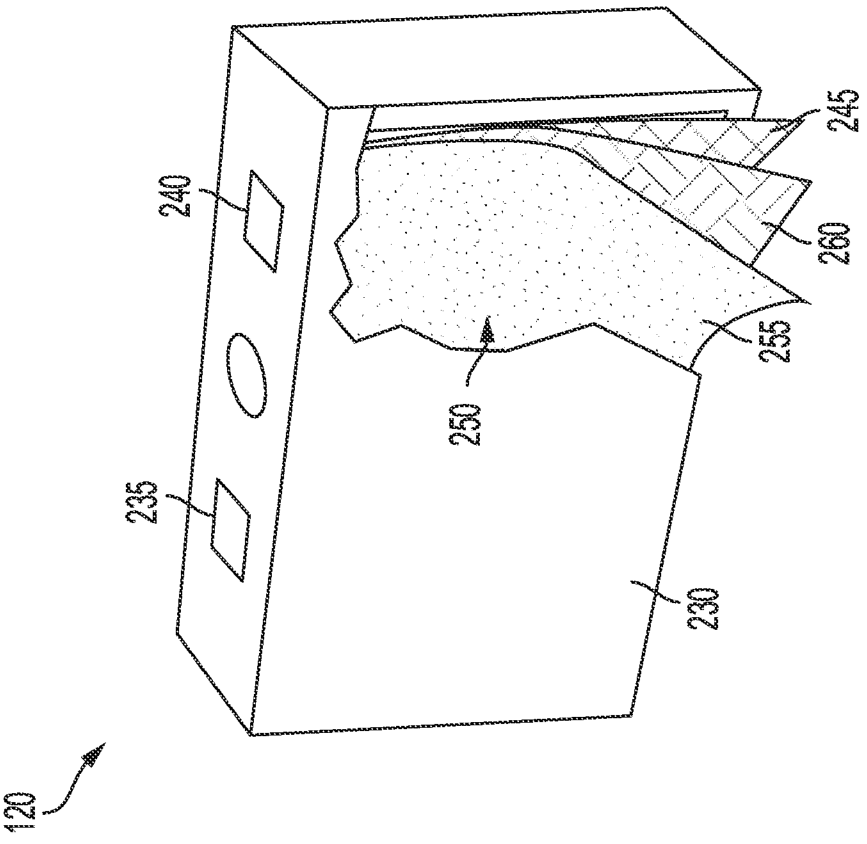
FIG. 2D depicts an example perspective view of a battery cell, in accordance with implementations.
Figure 2E:
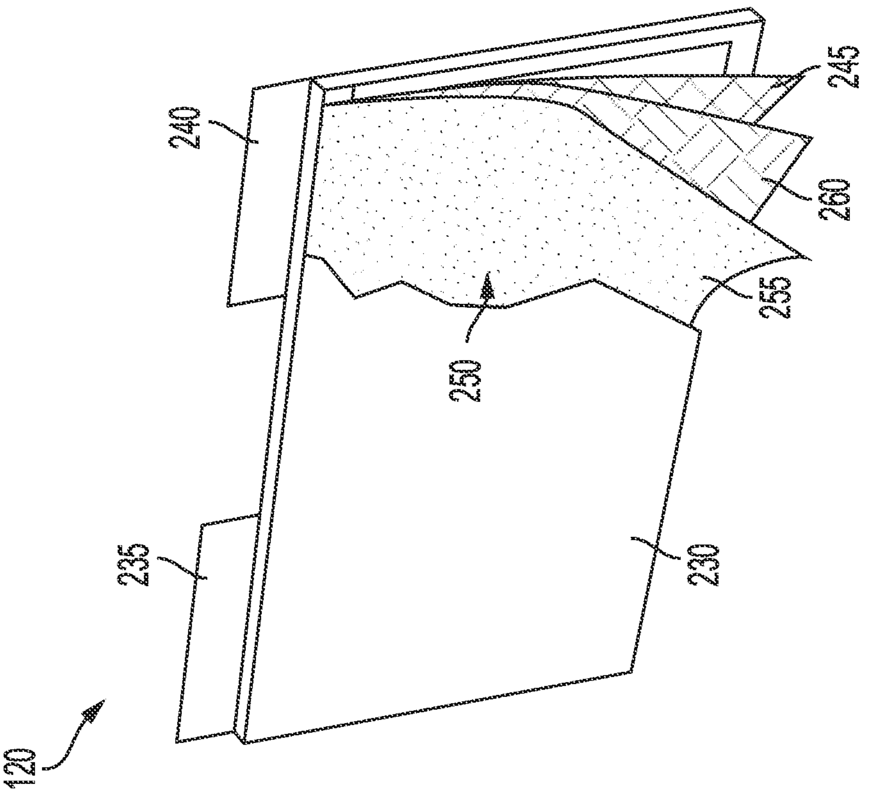
FIG. 2E depicts an example perspective view of a battery cell, in accordance with implementations.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2Si_2$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4O_x$, M=Ti, V, Mn, Cr, and Zr), for example Lithium iron phosphate (LFP), Lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, Lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2Si_2$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
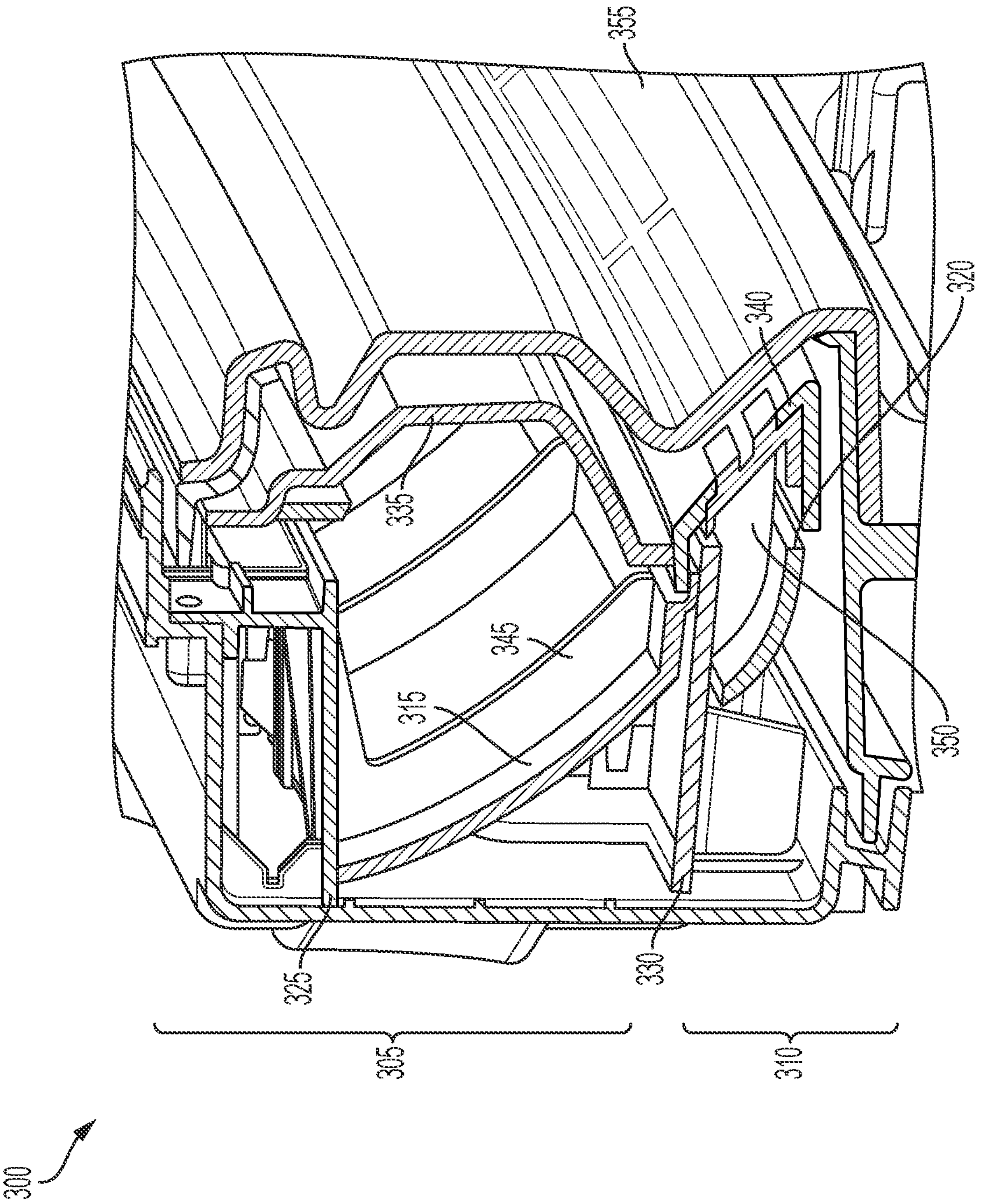
FIG. 3 depicts an example perspective sectional view of a portion of a lighting apparatus, in accordance with implementations.

FIG. 3 depicts a perspective sectional view of an apparatus 300, according to an example implementation. The apparatus 300 can include at least one light bar. For example, the light bar can be or can include one or more continuous or segmented strips of lights. The one or more light bars can be or can include one or more sections of light. For example, the apparatus 300 can include at least one first section 305 (e.g., a first light bar) and at least one second section 310 (e.g., a second light bar). The first section 305 can couple with the second section 310. For example, the first section 305 can position above the second section 310, below the second section 310, adjacent the second section 310, near the second section, or in another position relative to the second section 310. The first section 305 can be connected with the second section 310 (e.g., by one or more continuous materials, one or more fasteners, welded joints, adhesives, or other methods) or the first section 305 can be separate from and abutting the second section 310. The first section 305 can be positioned near the second section 310 within the apparatus. The first section 305 and the second section 310 may not contact one another (e.g., the first section 305 and the second section 310 can be coupled through various non-contact techniques).

The first section 305 can include at least one first light guide 315 and at least one first printed circuit board (PCB) 325. The first section 305 can include at least one first at least partially transparent or translucent cover 335. The first PCB 325 can include at least one first light source operably coupled with the first PCB 325. For example, the first PCB 325 can include one or more LEDs (e.g., white LEDs, RBG LEDs, or another type of LED), or another type of light source. The first PCB 325 can cause the first light source to display (e.g., emit, portray) light (e.g., responsive to receiving one or more signals, as described herein). The first light guide 315 can be or can include one or more reflectors, lenses, wave guides, or another component that can guide light emitted from the first light source of the first PCB 325. For example, the first light guide 315 can guide light emitted from the first light source of the first PCB 325 towards the transparent cover 335 to emit the light from the first PCB 325 out of the first transparent cover 335.

The second section 310 can include at least one second light guide 320 and at least one second printed circuit board (PCB) 330. The second section 310 can include at least one second at least partially transparent or translucent cover 340. The second PCB 330 can include at least one second light source operably coupled with the second PCB 330. For example, the second PCB 330 can include one or more LEDs (e.g., white LEDs, RBG LEDs, green LEDs, or another type of LED), or another type of light source. The second PCB 330 can cause the second light source to display light (e.g., responsive to receiving one or more signals, as described herein). The second light guide 320 can be or can include one or more reflectors, lenses, wave guides, or another component that can guide light emitted from the light source of the second PCB 330. For example, the second light guide 320 can guide light emitted from the second light source of the second PCB 330 towards the transparent cover 340 to emit the light from the second PCB 330 out of the second transparent cover 340.

The apparatus 300 can include at least one light-blocking or light-absorbing component. For example, the first section 305 can include at least one first divider 345 (e.g., a bezel). The first divider 345 can include at least one opaque (e.g., black) or reflective section to at least partially prevent light from passing through the first divider 345. The first divider 345 can at least partially protrude from the first light guide 315. For example, the first divider 345 can extend at least partially beyond a surface of the first light guide 315. The first divider 345 can extend from a surface of the first light guide 315 towards the first transparent cover 335. For example, the first divider 345 can at least partially prevent light emitted from the first light source (e.g., on the first PCB 325) from emitting in a direction beyond the first divider 345. The first section 305 can include multiple first dividers 345 positioned around the first PCB 325 to facilitate guiding light in a direction towards the first transparent cover 335. As described herein, the first divider 345 can facilitate forming at least two segments of the first section 305.

The second section 310 can include at least one second divider 350. The second divider 350 can include at least one opaque or reflective section to at least partially prevent light from passing through the second divider 350. The second divider 350 can at least partially protrude from the second light guide 320. For example, the second divider 350 can extend at least partially beyond a surface of the second light guide 320. The second divider 350 can extend from a surface of the second light guide 320 towards the second transparent cover 340. For example, the second divider 350 can at least partially prevent light emitted from the second light source (e.g., on the second PCB 330) from emitting in a direction beyond the second divider 350. The second section 310 can include multiple second dividers 350 positioned around the second PCB 330 to facilitate guiding light in a direction towards the second transparent cover 340. One or more of the first divider, the second divider 350, the first transparent cover 335, or the second transparent cover 340 can include at least one opaque or reflective portion that extends between a portion of the first section 305 and the second section 310 to facilitate preventing light from the first section 305 from bleeding into the second section 310 and light from the second section 310 from bleeding into the first section 305. As described herein, the second divider 350 can facilitate forming at least two segments of the second section 310.

The apparatus 300 can include at least one transparent enclosure 355 that at least partially covers the first transparent cover 335 or the second transparent cover 340. For example, the transparent enclosure 355 can include a continuous covering that can include at least one transparent portion to allow the first light from the first light source and the second light from the second light source to pass through the transparent enclosure 355 to emit external to the apparatus 300. The transparent enclosure 355 can form a portion of an exterior of the vehicle 105. For example, the transparent enclosure 355 can include a portion of a center lamp of the vehicle 105.

Figure 4:
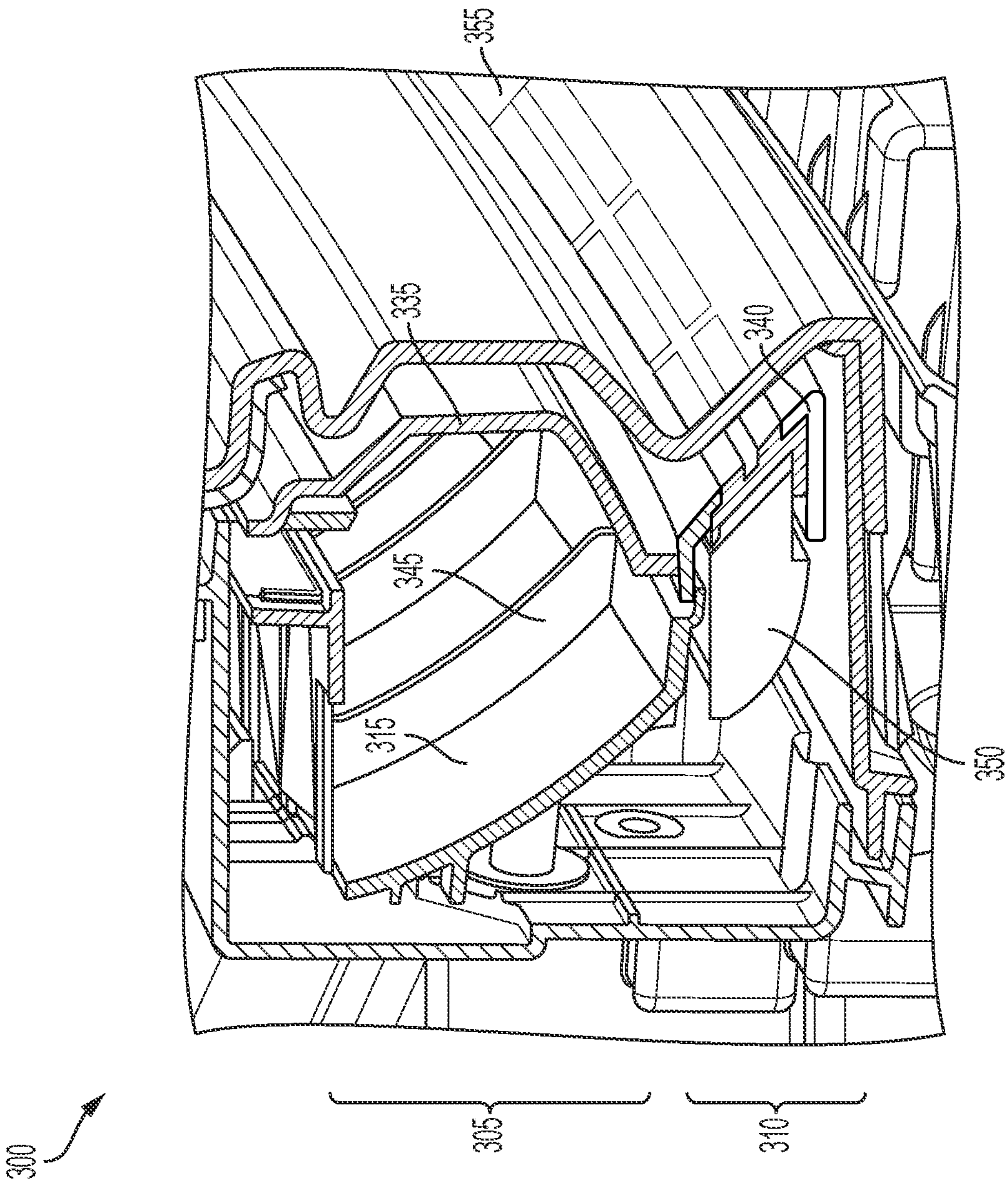
FIG. 4 depicts an example perspective sectional view of a portion of a lighting apparatus, in accordance with implementations.

FIG. 4 depicts a perspective sectional view of the apparatus 300, according to an example implementation. For example, FIG. 4 depicts the apparatus 300 cut along the second divider 350 depicted in FIG. 3. As depicted in FIG. 4, and among others, the second divider 350 can extend from the second light guide 320 towards or to the second transparent cover 340.

The first light guide 315 or the second light guide 320 can include a bent, arcuate, or curved shape to facilitate guiding light from the first PCB 325 or the second PCB 330 through the transparent enclosure 355. For example, as depicted in at least FIGS. 3 and 4, the first light guide 315 can include a curved shape extending away from the first PCB 325 and the second light guide 320 can include a curved shape extending away from the second PCB 330. The first light guide 315 and the second light guide 320 can each include at least one reflective material such that at least a portion of the light from the first PCB 325 and at least a portion of the light from the second PCB 330 is reflected and not absorbed or passed through the light guides. For example, the first PCB 325 having the first light source and the first light guide 315 can define the first section 305. The at least one first divider 345 and the reflective first light guide 315 can facilitate guiding light from the first PCB 325 in a general direction (e.g., towards the first transparent cover 335 and out through the transparent enclosure 355) such that the light from the first section 305 does not interfere with light within the second section 310. The at least one first divider 345 can extend a portion between the first light guide 315 and the first transparent cover 335 such that the first divider 345 partially prevents the light from the first PCB 325 from scattering outward (e.g., lessens the intensity of light in at least one direction).

The first light guide 315 can include a similar shape and configuration to the second light guide 320. For example, as shown in at least FIGS. 1 and 2, the first light guide 315 can be positioned underneath the first PCB 325 to emit light outward. Similarly, the second light guide 320 can be positioned underneath the second PCB 330 to emit light outward. The first light guide 315 and the second light guide 320 can include similar or different shapes. The first light guide 315 can be larger than the second light guide 320, the same size as the second light guide 320, or smaller than the second light guide 320.

The second PCB 330 having the first light source and the second light guide 320 can define the second section 310. The at least one second divider 350 and the reflective second light guide 320 can facilitate guiding light from the second PCB 330 in a general direction (e.g., towards the second transparent cover 340 and out through the transparent enclosure 355) such that the light from the second section 310 does not interfere with light within the first section 305. The at least one second divider 350 can extend a portion between the second light guide 320 and the second transparent cover 340 such that the second divider 350 partially prevents the light from the second PCB 330 from scattering outward (e.g., lessens the intensity of light in at least one direction). The second divider 350 can extend entirely between the second light guide 320 and the second transparent cover 340 such that the light from the second PCB 330 cannot scatter in an outward direction (e.g., and only remains within the confines of the second PCB 330, the second light guide 320, the first second divider 350, and another second divider 350 that opposes the first second divider 350, such that the light exits through the second cover 340 only).

Figure 5:
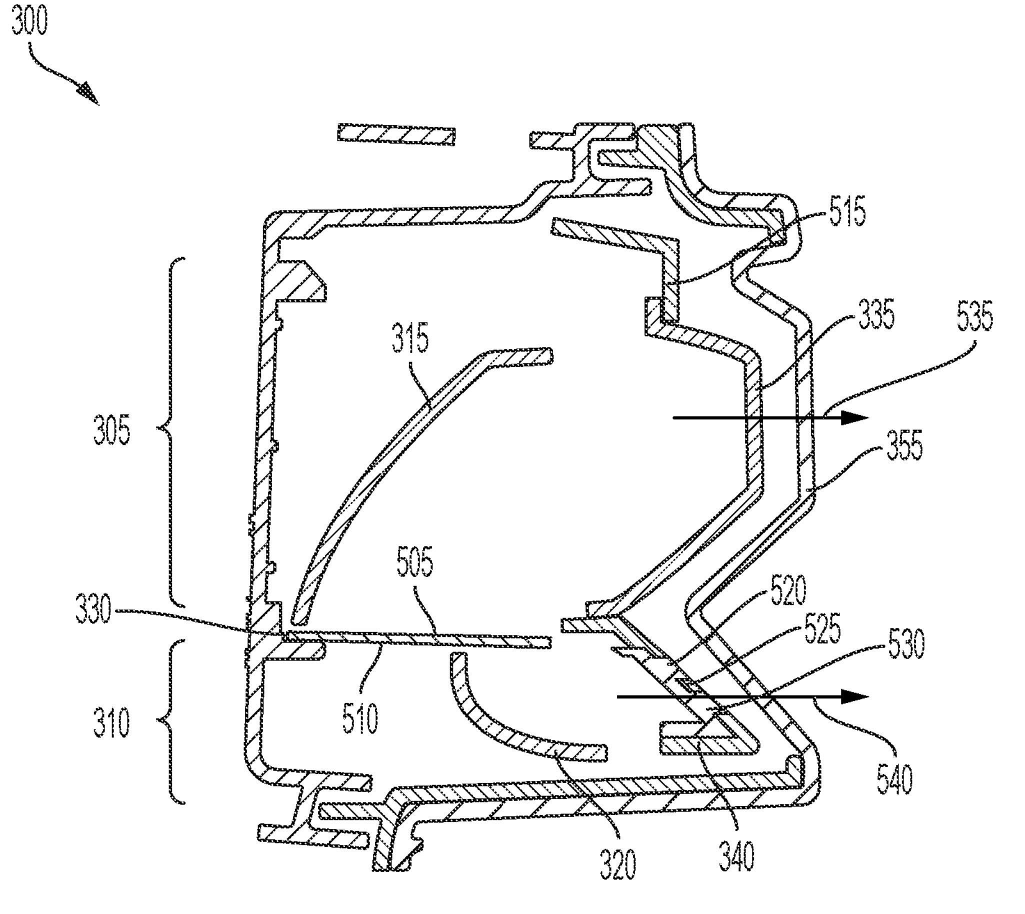
FIG. 5 depicts an example sectional view of a portion of a lighting apparatus, in accordance with implementations.

FIG. 5 depicts a side sectional view of the apparatus 300, according to an example implementation. The second PCB 330 can emit both the first light source and the second light source (e.g., such that the first PCB 325 may not be included within the first section 305). For example, the second PCB 330 can include a first side 505 and an opposing second side 510. The second PCB 330 can cause the first light source to emit light from the first side 505 of the second PCB 330 and the second light source to emit light from the second side 510 of the second PCB 330.

The first light guide 315 can be shaped and configured to guide light from the second PCB 330 outward through the first transparent cover 335 or through the transparent enclosure 355 (e.g., as shown by arrow 535). For example, the first light guide 315 can curve, bend, or extend from or near a portion of the second PCB 330 towards the first transparent cover 335 to guide light in the direction as shown by arrow 535. The second light guide 320 can be shaped and configured to guide light from the second PCB 330 outward through the second transparent cover 340 or through the transparent enclosure 355 (e.g., as shown by arrow 540). For example, the second light guide 320 can curve, bend, or extend from or near a portion of the second PCB 330 towards the second transparent cover 340 to guide light in the direction as shown by arrow 540. The first light guide 315 can at least partially oppose the second light guide 320 relative to the second PCB 330, as depicted in at least FIG. 5. For example, a reflective surface of the first light guide 315 can face a reflective surface of the second light guide 320. The second PCB 330, the first transparent cover 335, or the second transparent cover 340 can facilitate dividing the first section 305 and the second section 310 such that the light from the first section 305 does not interfere with the light from the second section or the light from the second section 310 does not interfere with the light from the first section 305.

The apparatus 300 can include at least one third divider 515 that can facilitate at least partially blocking or preventing light from scattering in one or more directions (e.g., from the first light source on the first side 505 of the second PCB 330). The third divider 515 can be positioned at least partially within the first section 305. For example, the third divider 515 can be positioned at least partially above or in front of the first light guide 315 to facilitate blocking light from scattering upwards or outwards (e.g., in a direction away from the direction of arrow 535). The third divider 515 can include one or more opaque or reflective materials. The third divider 515 can include at least one or more similar materials to the first or second divider, for example. The third divider 515 can be separate from or coupled with the first transparent cover 335.

The second transparent cover 340 can include at least one partially or fully opaque portion. For example, the second transparent cover 340 can include at least one transparent portion 520 and at least one opaque portion 525. The least one transparent portion 520 can be formed of one or more at least partially transparent or translucent materials such that light guided from the second light guide 320 can pass through the at least one transparent portion 520 towards the transparent enclosure 355 (e.g., in the direction of arrow 540). The at least one opaque portion 525 can include one or more at least partially opaque materials to facilitate preventing light from the second light guide 320 from passing through the opaque portion 525. The opaque portion 525 can be disposed in between two transparent portions (e.g., portion 520 and portion 530) such that the light from the second light source is passed through the second transparent cover 340 in at least two fragments. For example, as shown in at least FIG. 8, the second section 310 of the apparatus 300 can include at least one first lighted portion 805 and at least one second lighted portion 810 that are divided by at least one non-lighted portion (e.g., by the at least one opaque portion 525). The first lighted portion 805 can be positioned above the second lighted portion 810. The first lighted portion 805 can be positioned adjacent the second lighted portion 810. With this configuration, the second section 310 can display light in one or more patterns (e.g., in a grid pattern between the transparent portions 520 and the opaque portion 525).

The at least one transparent portion 520 and at least one opaque portion 525 of the second transparent cover 340 can include a variety of other patterns or shapes. For example, the second transparent cover 340 can include one transparent portion 520, three transparent portions, or more. The transparent portions 520 or opaque portions 525 can include a variety of shapes including, but not limited to, circular, rectangular, triangular, serpentine, abstract, or various other shapes. Therefore, the second section 310 can include a plurality of segments positioned adjacent one another can form various patterns of second light. For example, as shown in at least FIG. 8, the second section 310 can include a grid pattern of two lighted portions extending horizontally that are stacked on top of one another.

Figure 6:
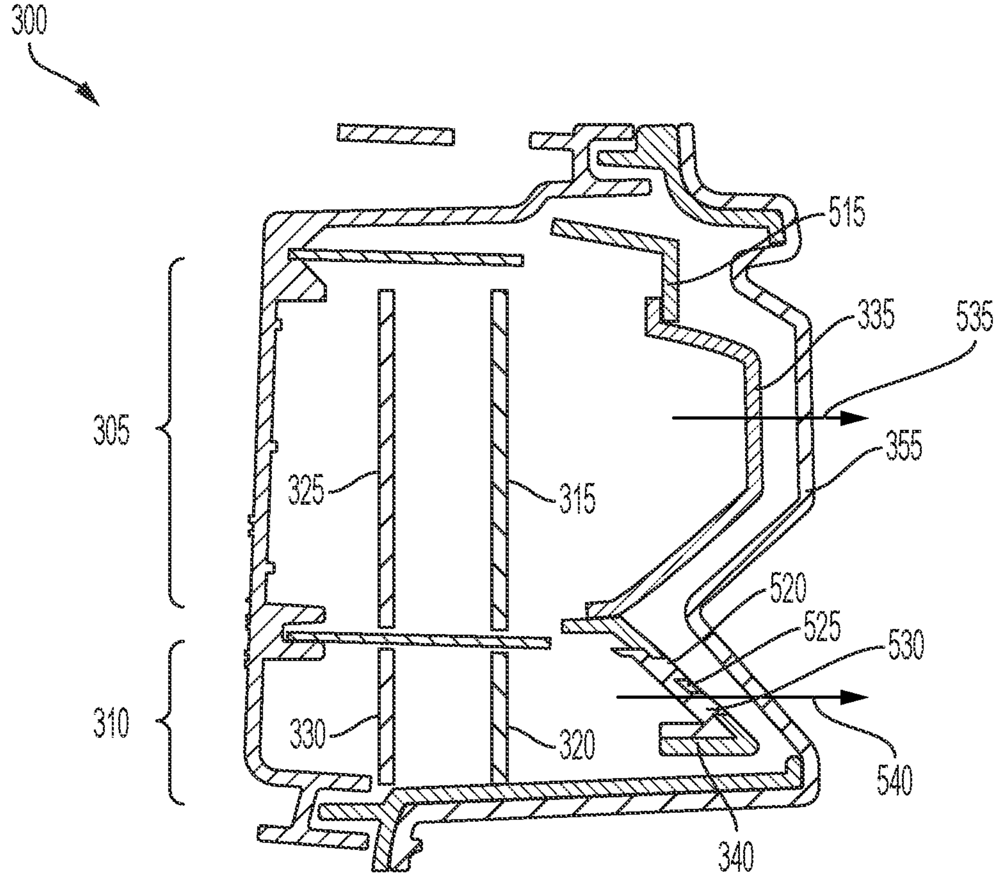
FIG. 6 depicts an example sectional view of a portion of a lighting apparatus, in accordance with implementations.

FIG. 6 depicts a side sectional view of the apparatus 300, according to an example implementation. The first PCB 325 or the second PCB 330 can position vertically within the first section 305 and the second section 310. For example, the first PCB 325 can position substantially (e.g., within 10%) perpendicular to arrow 535 or the second PCB 330 can position substantially (e.g., within 10%) perpendicular to arrow 540. The first PCB 325 can direct the first light source directly in a first direction towards the first transparent cover 335 (e.g., with or without a light guide). The second PCB 330 can direct the second light source directly in a second direction towards the second transparent cover 340 (e.g., with or without a light guide). The first PCB 325 and the second PCB 330 can be independent and separate from one another (e.g., by space, by one or more dividers, or in another manner). The first PCB 325 and the second PCB 330 can be coupled with one another (e.g., part of one singular PCB or operably or communicably connected).

The first section 305 can include at least one first light guide 315. The first light guide 315 can position substantially parallel with the first PCB 325 or the first light guide 315 can be curved or angled relative to the first PCB 325. The first light guide 315 can include one or more at least partially transparent materials to facilitate guiding light emitted from the first PCB 325 towards and through the first transparent cover 335. For example, the first light guide 315 can include one or more colored transparent materials (e.g., white transparent material). The second section 310 can include at least one second light guide 320. The second light guide 320 can position substantially parallel with the second PCB 330 or the second light guide 320 can be curved or angled relative to the second PCB 330. The second light guide 320 can include one or more at least partially transparent materials to facilitate guiding light emitted from the second PCB 330 towards and through the second transparent cover 340. For example, the second light guide 320 can include one or more colored transparent materials (e.g., green transparent material). The first light guide 315 and the second light guide 320 can be independent and separate from one another (e.g., by space, by one or more dividers, or in another manner). The first light guide 315 and the second light guide 320 can be coupled with one another (e.g., part of one singular light guide connected in one or more ways).

Figure 11:
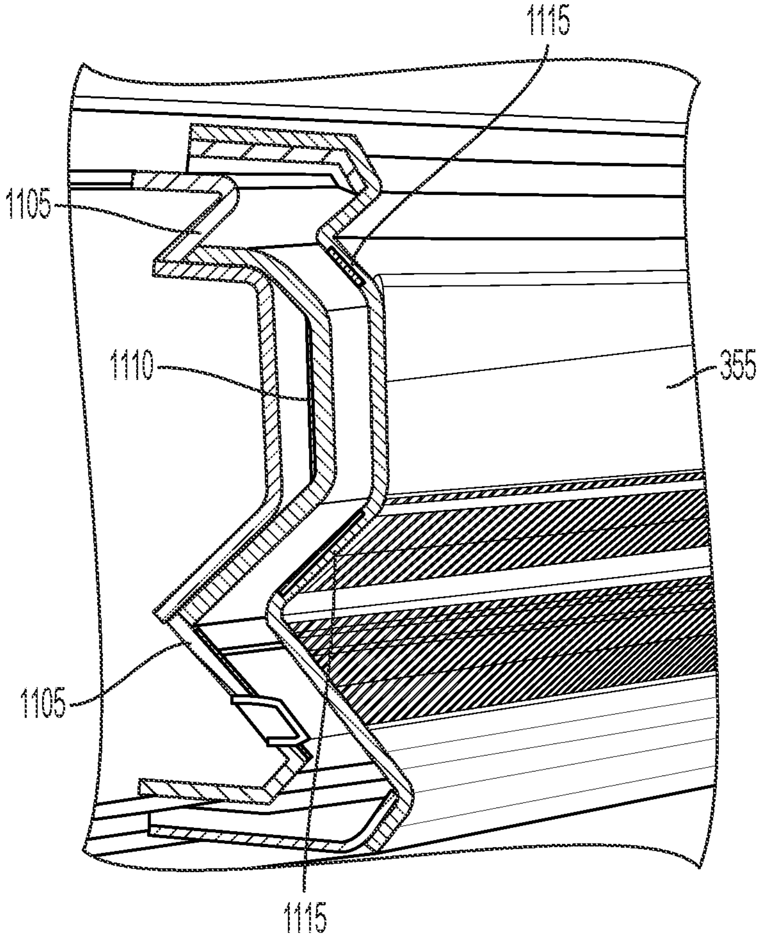
FIG. 11 depicts an example perspective sectional view of a portion of a lighting apparatus, in accordance with implementations.

The apparatus 300 can include a variety of materials or textures to facilitate guiding light, blocking light, reflecting light, or a combination thereof. For example, FIG. 11 depicts a sectional view of the apparatus 300, according to an example implementation. The apparatus 300 can include at least one micro texture 1105. For example, the micro texture 1105 can include one or more transparent materials (e.g., PMMA or PC) that can have a smoke effect within the material (e.g., about 10% to 30% tint) and some additional molded-in graining to facilitate delivering a non-visible function. For example, at least a portion of the first divider 345, the second divider 350, or the third divider 515 can include one or more micro textures 1105. The micro texture can include one or more black materials to facilitate blocking or inhibiting light from passing through the micro texture 1105.

The apparatus 300 can include at least one pill texture 1110. For example, the pill texture 1110 can include one or more transparent materials (e.g., PMMA or PC) or an inherently diffused milky material (e.g., PMMA) with molded in flutes, pills, prisms, patterns, or various other shapes that are highlighted when illuminated. For example, at least a portion of the first transparent cover 335 or at least a portion of the second transparent cover 340 can include one or more pill textures 1110. The pill texture 1110 can include one or more at least partially transparent materials (e.g., clear or frosted glass or plastic materials) that include one or more pill-shaped features. The pill-shaped (e.g., oblong, cylindrical, oval-shaped) features can be raised from a surface of the first transparent cover 335 or the second transparent cover 340 such that the pill-shaped features can be detected or felt relative to a surface to define the pill texture 1110. The first transparent cover 335 or the second transparent cover 340 can include one or more layers of material. For example, the first transparent cover 335 or the second transparent cover 340 can include at least one frosted layer of material or at least one clear layer of material (e.g., having the pill texture 1110). One or more portions of the frosted layer or the clear layer of materials can contact one another or be spaced apart from one another.

The apparatus 300 can include at least one vertical line texture 1115. For example, the pill texture 1110 can include one or more transparent materials (e.g., PMMA or PC) or an inherently diffused milky material (e.g., PMMA) with molded in flutes, pills, prisms, patterns, or various other shapes that are highlighted when illuminated. For example, at least a portion of the transparent enclosure 355 can include at least one vertical line texture 1115. The vertical line texture 1115 can include one or more raised or flush vertical line features of an at least partially clear or transparent material. For example, at least a portion of the transparent enclosure 355 can include a plurality of vertical line features that extend along a portion of a surface of the transparent enclosure 355, as depicted in at least FIG. 11.

Figure 7:
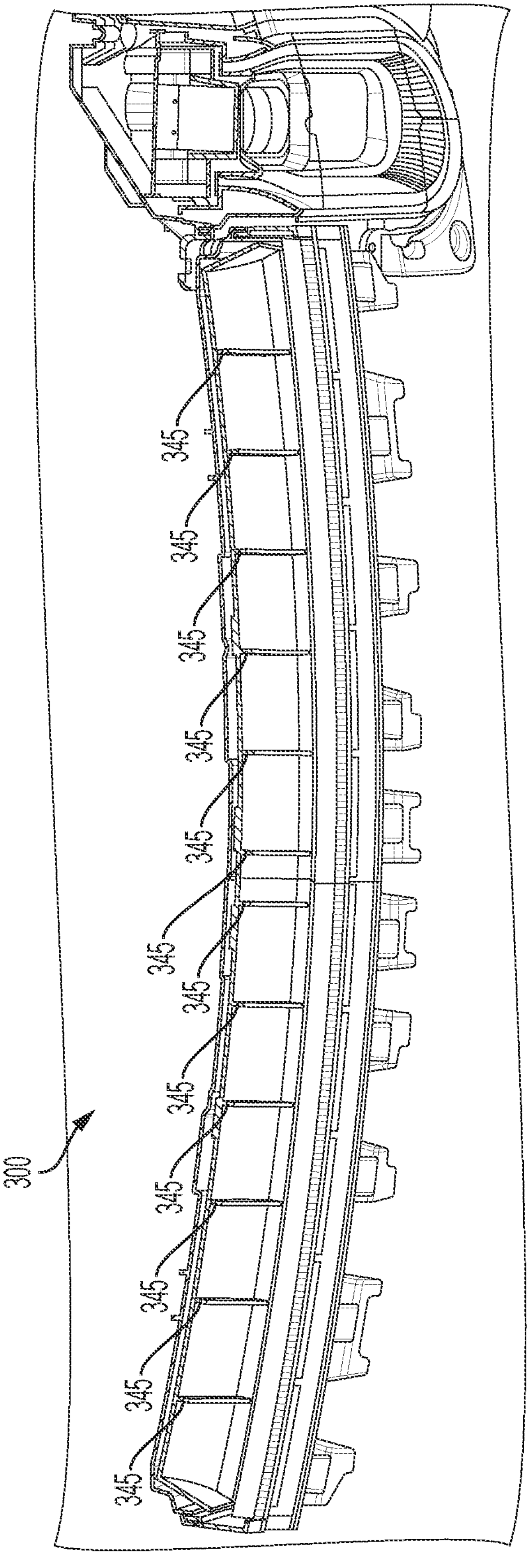
FIG. 7 depicts an example top view of a portion of a lighting apparatus, in accordance with implementations.

FIG. 7 depicts a top view of a portion of the apparatus 300, according to an example implementation. The apparatus 300 can include at least one first section 305 or at least one second section 310. At least one of the first section 305 or the second section 310 can include a plurality of segments. For example, the first section 305 or the second section 310 can be separated by at least one divider (e.g., the first divider 345 as depicted in at least FIG. 7 or the second divider 350 not visible in FIG. 7). The second divider 350 can be positioned substantially below the first dividers 345 depicted in FIG. 7.

Figure 8:
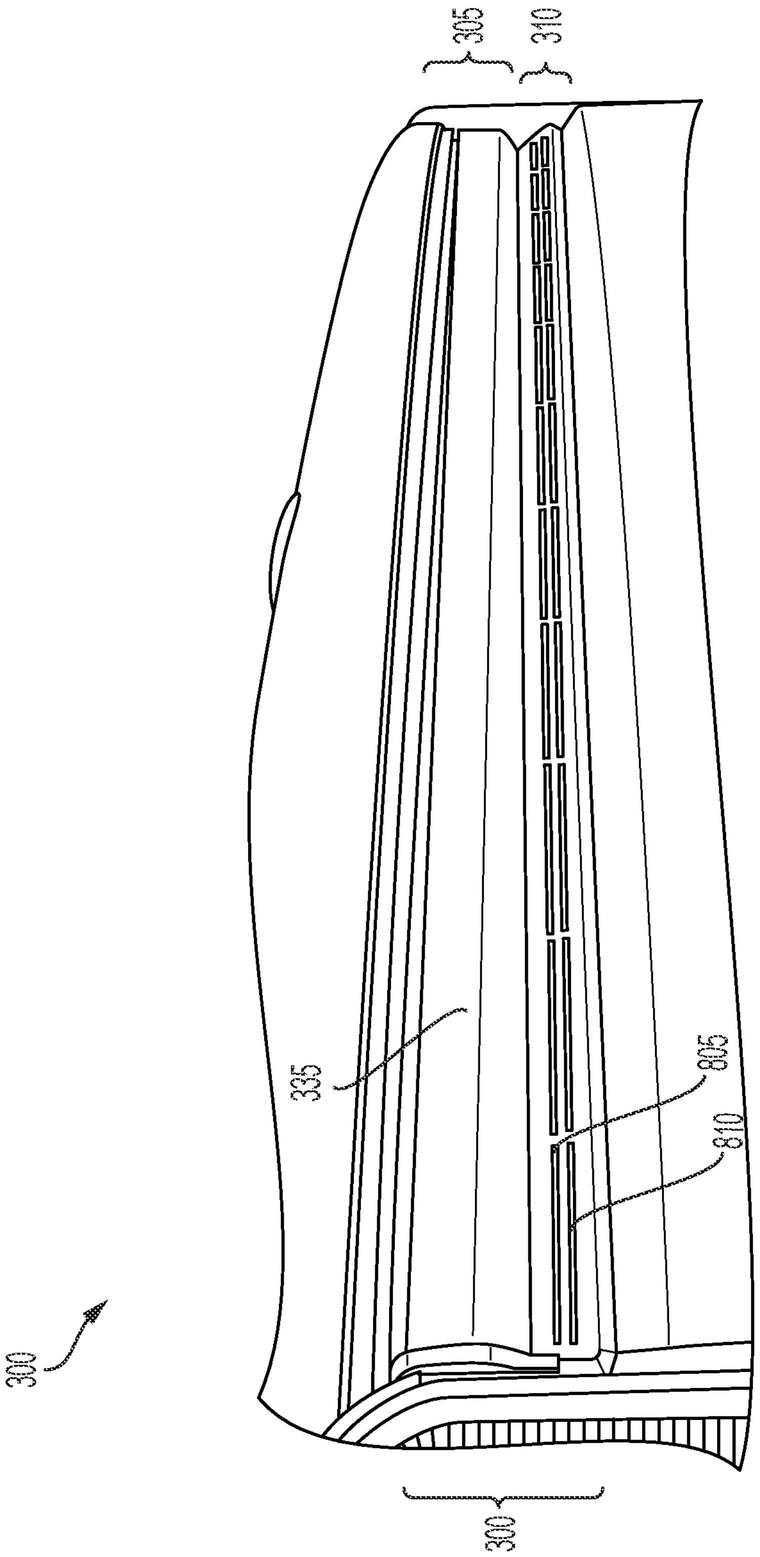
FIG. 8 depicts an example front view of a portion of a lighting apparatus, in accordance with implementations.
Figure 10:
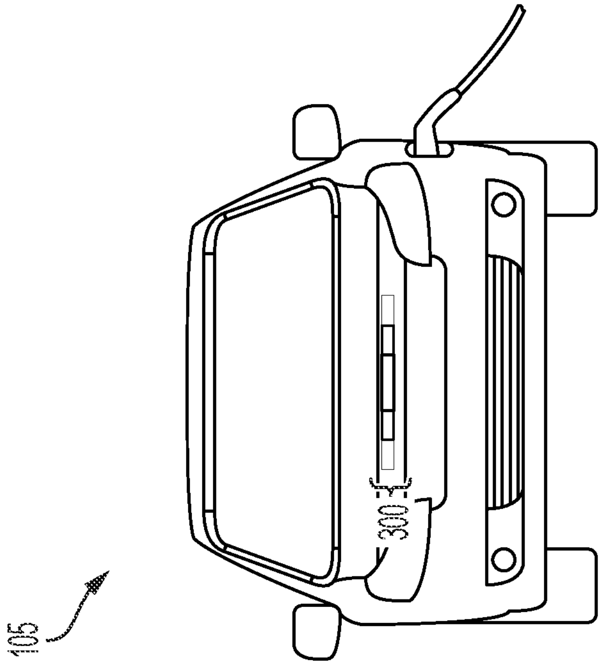
FIG. 10 depicts an example front view of a portion of a vehicle, in accordance with implementations.
Figure 9:
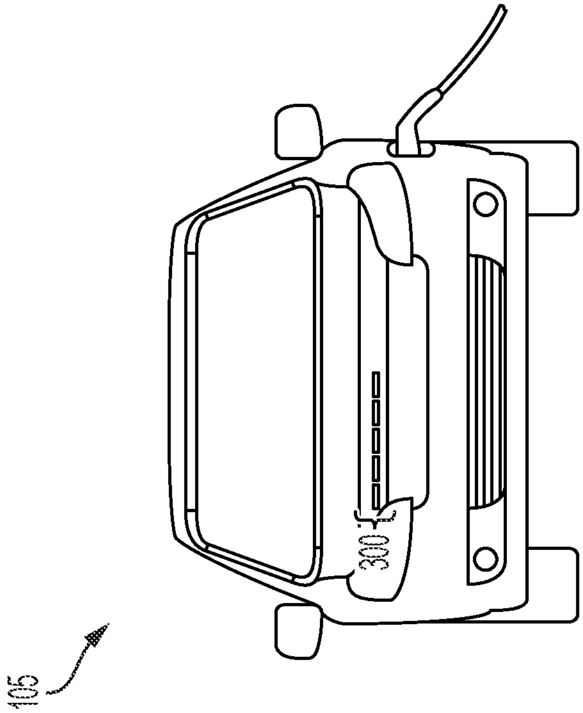
FIG. 9 depicts an example front view of a portion of a vehicle, in accordance with implementations.

The one or more dividers can cause a segmented light effect. For example, as depicted in FIGS. 8-10, the apparatus 300 can display various segments of light (e.g., divided or at least partially divided by one or more dividers described herein). For example, the apparatus 300 can display segmented light as opposed to one, singular, continuous light. As described herein, the dividers can completely block light between one segment of the first section 305 and another segment of the first section 305 (e.g., as depicted in at least FIG. 9), or between one segment of the second section 310 and another segment of the second section 310 or the dividers can partially block light between segments. For example, the dividers can partially block light such that an intensity of light in one segment (e.g., a first section 305 or second section 310) can be greater than or less than an intensity of light in another segment (e.g., an adjacent first segment, an adjacent second segment, or another section of the apparatus 300). For example, as depicted in FIG. 10, the apparatus 300 can display various intensities of light. The various segments of light (e.g., divided by one or more dividers) can be various different sizes or locations. For example, one segment can be greater in size than another segment.

The one or more first sections 305 of the apparatus 300 can display a first function of light. For example, the first section 305 can display one or more of a daytime running light, a position light, a welcome light (e.g., when the vehicle 105 locks, unlocks, or when a door is opened), or another function of light of the vehicle 105. The one or more second sections 310 can display a second function of light. For example, the plurality of segments of the second section 310 can cooperate to display a charge status of a battery of the vehicle 105 (e.g., the battery pack 110 described herein or at least one battery cell 120 described herein). For example, the apparatus 300 can include an amount of segments, such as 10 segments. Each segment can include a respective second light source (e.g., a second PCB 330) and second light guide 320. The second PCB 330 can cause at least one segment of the second section 310 to display light. When the battery pack 110 is fully charged, the second PCB 330 can cause each of the light sources of the 10 segments to display light through the second section 310 (e.g., every light source from the second PCB 330 is active) such that each segment displays light. When the battery pack 110 is less than fully charged (e.g., 50% charged), a portion of the second PCBs 330 can cause light to emit from each segment of the second section 310. For example, half of the PCBs 330 of the 10 segments (e.g., grouped on a left-hand side or right-hand side) can display light to indicate the charge status of the battery 110 is approximately half charged, as depicted in FIG. 9. When the battery pack 110 is low-power (e.g., 25% or lower), the second PCBs 330 can cause only of portion of the 10 segments (e.g., one, two, three) to display light to indicate the charge status of the battery 110 is low. This example is for illustrative purposes. The apparatus 300 can include significantly more segments (e.g., 50 segments) or significantly less segments (e.g., two segments).

At least one of the first PCBs 325 or the second PCBs 330 can communicably couple with one or more controllers of the vehicle 105. For example, the first PCB 325 or the second PCB 330 can receive or transmit signals to or from a battery management system ("BMS") of the vehicle 105 that is communicably coupled with the battery pack 110. The BMS can transmit signals directly or indirectly (e.g., via a CAN bus) to the second PCBs 330 to indicate a charge status of the battery pack 110. Based on the received signals, each second PCB 330 of the plurality of second PCBs 330 can either cause the second light source (e.g., LEDs) to emit light or not cause the second light source to emit light. Similarly, the first PCB 325 or the second PCB 330 can receive or transmit signals to or from an electronic control unit ("ECU") or another controller of the vehicle 105. For example, the ECU can transmit signals directly or indirectly to the first PCB 325 or the second PCB 330 to indicate the first PCB 325 or the second PCB 330 to cause light from the first light source (e.g., LEDs) to emit or not cause the first light source to emit light. For example, each first PCB 325 or each second PCB 330 of the plurality of first PCBs 325 or the plurality of second PCBs 330 can receive signals indicating to display a daytime running light, a positon light, a welcome light, or another type of light.

The apparatus 300 can be located in various positions of the vehicle 105. For example, The apparatus 300 can function as or can be positioned on a lamp on a front of the vehicle 105, a rear of the vehicle 105, a side of the vehicle 105, a top of the vehicle 105, a bottom of the vehicle 105, a door of the vehicle 105, a windshield of the vehicle 105, or another portion of the vehicle 105. In other words, the apparatus 300 can be positioned such that a user inside or outside the vehicle 105 can see the light displayed from the apparatus 300.

One or more portions of the apparatus 300 can be manufactured in a variety of ways. For example, the second transparent cover 340 can be formed by one or more injection processes (e.g., injection molding). As described herein, the second transparent cover 340 can be made from at least two materials or at least two colors of one material such that a portion of the second transparent cover 340 is at least partially transparent and a portion of the second transparent cover 340 is at least partially opaque or reflective. The second transparent cover 340 can be formed by a two-shot process. For example, the second transparent cover 340, or another portion of the apparatus 300, can be formed via two-shot injection molding to form the multi-color or multi-material transparent cover 340.

Figure 12:
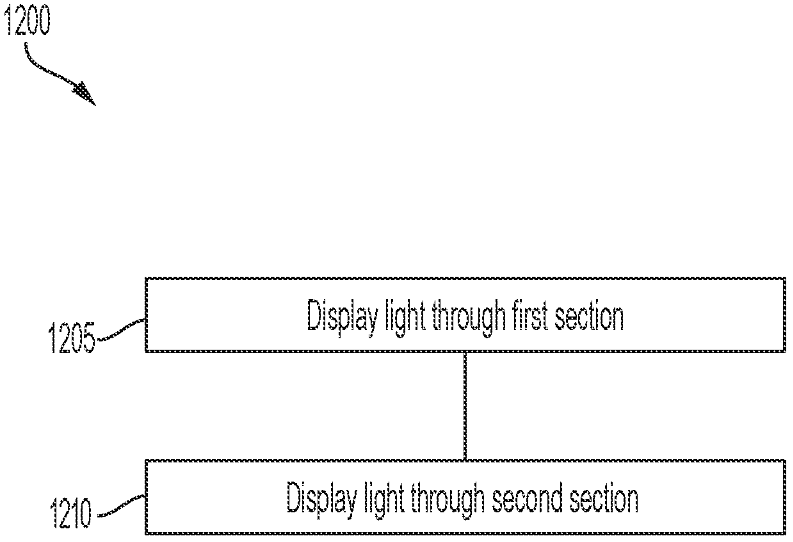
FIG. 12 depicts an example illustration of a process, in accordance with implementations.

FIG. 12 depicts an illustration of a method 1200, according to an example implementation. The method 1200 can include displaying the first light from the first light source through the first section 305 of the apparatus 300, as depicted in act 1205. For example, the first PCB 325 or the second PCB 330 can receive one or more signals indicating to emit light from the first light source (e.g., indicating the display a daytime running light, a position light, a welcome light, or another type of light). The first PCB 325 or the second PCB 330 can cause the first light source to emit light towards the first light guide 315. The first light guide 315 can guide light (e.g., by reflecting light) towards the first transparent cover 335 and out through the transparent enclosure 355 such that light is visible from the exterior of the apparatus 300.

The method 1200 can include displaying the second light from the second light source through the second section 310 of the apparatus 300, as depicted in act 1210. For example, the second PCB 330 can receive one or more signals indicating to emit light from the second light source (e.g., indicating a charge status of the battery pack 110). The second PCB 330 can cause the second light source to emit light towards the second light guide 320. The second light guide 320 can guide light (e.g., by reflecting light) towards the second transparent cover 340 and out through the transparent enclosure 355 such that light is visible from the exterior of the apparatus 300.

The apparatus can include at least one first section 305 and at least one second section 310 coupled with one another. The first section 305 can include at least one divider that at least partially blocks light between the one or more portions of the first section 305 or one or more of portions of the second section 310. For example, the first divider 345, the second divider 350, or the third divider 515 can separate the segments. The first section 305 can provide light indicative of a daytime running light, a position light, or another type of light. The first section 305 can include one or more partial dividers such that one of the first light sources from a first segment of the first section 305 can cause light to at least partially scatter into an adjacent segment at a lower intensity.

The second section 310 can provide a segmented light pattern. For example, the second section 310 can include dividers that completely block light from scattering between segments such that each segment of the second section 310 operates independently to display a charge status of the battery pack 110 (e.g., all segments displaying light can represent a full battery charge, half the segments displaying light can represent a half battery charge, and so on).

Figure 13:
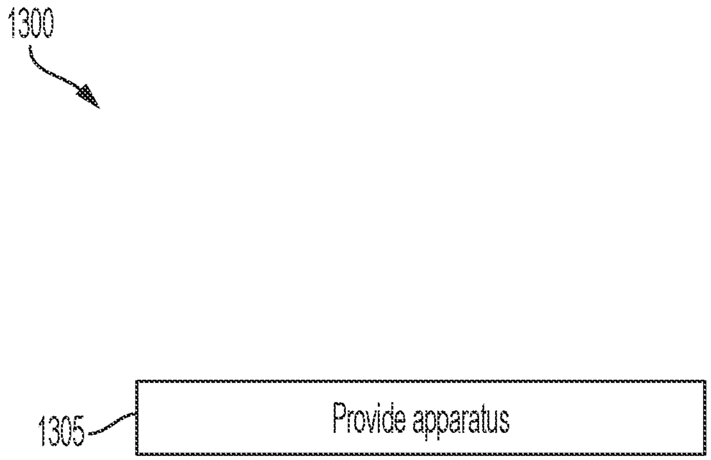
FIG. 13 depicts an example illustration of a process, in accordance with implementations.

FIG. 13 depicts an illustration of a method 1300, according to an example implementation. The method 1300 can include providing the apparatus 300, as depicted in act 1305. The apparatus 300 can include the first section 305 and the second section 310. The first section 305 can couple with the second section 310. For example, the first section 305 can position above the second section 310, below the second section 310, adjacent the second section 310, near the second section, or in another position relative to the second section 310. The first section 305 can be connected with the second section 310 (e.g., by one or more continuous materials, one or more fasteners, welded joints, adhesives, or other methods) or the first section 305 can be separate from and abutting the second section 310. The first section 305 can be positioned near the second section 310 within the apparatus. The first section 305 and the second section 310 may not contact one another (e.g., the first section 305 and the second section 310 can be coupled through various non-contact techniques).

The apparatus 300 can include at least one PCB (e.g., the first PCB 325 or the second PCB 330). The apparatus 300 can include at least one first light source and at least one second light source. The first PCB 325 or the second PCB 330 can cause the first light source or the second light source to emit light. The first section 305 can include at least one first light guide 315. The first section 305 can include at least one first at least partially transparent or translucent cover 335. The first PCB 325 or the second PCB 330 can cause the first light source to emit light. For example, the first light guide 315 can guide light emitted from the first light source towards the transparent cover 335 to emit the light out of the first transparent cover 335.

The second section 310 can include at least one second light guide 320. The second section 310 can include at least one second at least partially transparent or translucent cover 340. The second PCB 330 can cause the second light source to emit light. For example, the second light guide 320 can guide light emitted from the second light source of the second PCB 330 towards the transparent cover 340 to emit the light from the second PCB 330 out of the second transparent cover 340.

The apparatus 300 can include at least one light-blocking or light-absorbing component. For example, the first section 305 can include at least one first divider 345. The first divider 345 can include at least one opaque or reflective section to at least partially prevent light from passing through the first divider 345. The first divider 345 can at least partially protrude from the first light guide 315. For example, the first divider 345 can extend at least partially beyond a surface of the first light guide 315. The first divider 345 can extend from a surface of the first light guide 315 towards the first transparent cover 335. For example, the first divider 345 can at least partially prevent light emitted from the first light source from emitting in a direction beyond the first divider 345. The first section 305 can include multiple first dividers 345 positioned around the first PCB 325 to facilitate guiding light in a direction towards the first transparent cover 335.

The second section 310 can include at least one second divider 350. The second divider 350 can include at least one opaque or reflective section to at least partially prevent light from passing through the second divider 350. The second divider 350 can at least partially protrude from the second light guide 320. For example, the second divider 350 can extend at least partially beyond a surface of the second light guide 320. The second divider 350 can extend from a surface of the second light guide 320 towards the second transparent cover 340. For example, the second divider 350 can at least partially prevent light emitted from the second light source (e.g., on the second PCB 330) from emitting in a direction beyond the second divider 350. The second section 310 can include multiple second dividers 350 positioned around the second PCB 330 to facilitate guiding light in a direction towards the second transparent cover 340. One or more of the first divider, the second divider 350, the first transparent cover 335, or the second transparent cover 340 can include at least one opaque or reflective portion that extends between a portion of the first section 305 and the second section 310 to facilitate preventing light from the first section 305 from bleeding into the second section 310 and light from the second section 310 from bleeding into the first section 305.

The apparatus 300 can include at least one transparent enclosure 355 that at least partially covers the first transparent cover 335 or the second transparent cover 340. For example, the transparent enclosure 355 can include a continuous covering that can include at least one transparent portion to allow the first light from the first light source and the second light from the second light source to pass through the transparent enclosure 355 to emit external to the apparatus 300. The transparent enclosure 355 can form a portion of an exterior of the vehicle 105. For example, the transparent enclosure 355 can include a portion of a center lamp or other light (e.g., tail light) of the vehicle 105. The first section 305 can display a first light for the vehicle 105 (e.g., at least a portion of a tail light, a daytime running light, a position light, or another light). The second section 310 can display a second light for the vehicle 105 (e.g., charge indicator light of the battery 110 of the vehicle 105).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of “including” “comprising” “having” “containing” “involving” “characterized by” “characterized in that” and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to “an implementation,” “some implementations,” “one implementation” or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to “or” may be construed as inclusive so that any terms described using “or” may indicate any of a single, more than one, and all of the described terms. References to at least one of a conjunctive list of terms may be construed as an inclusive OR to indicate any of a single, more than one, and all of the described terms. For example, a reference to “at least one of ‘A’ and ‘B’” can include only ‘A’, only ‘B’, as well as both ‘A’ and ‘B’. Such references used in conjunction with “comprising” or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, the first section 305 can include various components from the second section 310 or the second section 310 can include various components from the first section 305. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to “approximately,” “substantially” or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:

a first light bar comprising a first light guide configured to reflect a first light in a first direction from a first source, the first source coupled with a first printed circuit board; and a second light bar comprising:

a divider configured to define a plurality of segments of the second light bar; and a second light guide configured to reflect a second light in a second direction from at least one second source to the plurality of segments, the at least one second source coupled with a second printed circuit board;

a cover at least partially surrounding the divider and the second light guide, the cover having a first transparent portion, a second transparent portion, and an opaque portion coupled with and disposed between the first transparent portion and the second transparent portion to provide a patterned display of the second light;

the divider extends along the second light guide outward beyond an end surface of the second light guide in the second direction towards the cover;

the second printed circuit board disposed between the first light guide and the second light guide; and the second printed circuit board configured to:

control the at least one second source to emit the second light via the plurality of segments to produce a linear display to indicate a status of one or more batteries of a vehicle.

2. The apparatus of claim 1, comprising:

the first printed circuit board to cause the first source to emit the first light towards the first light guide to reflect the first light from the first source.

3. The apparatus of claim 1, comprising:

the first printed circuit board to cause the first source to emit the first light in a third direction towards the first light guide.

4. The apparatus of claim 1, comprising:

the first light bar is configured to function as at least one of a daytime running light or a position light;

wherein the status of the one or more batteries of the vehicle is a charge status of the one or more batteries of the vehicle.

5. The apparatus of claim 1, comprising:

the first light bar comprises a tail light of the vehicle;

wherein the linear display is a charge indicator light of the one or more batteries of the vehicle.

6. The apparatus of claim 1, comprising:

the divider configured to at least partially block light between a first segment of the plurality of segments and a second segment of the plurality of segments.

7. The apparatus of claim 1, comprising:

the first transparent portion and the second transparent portion of the cover interlocking with the opaque portion of the cover.

8. The apparatus of claim 1, comprising:

the cover includes a material comprising at least one of a micro texture, a pill texture, or a vertical line texture.

9. A method, comprising:

emitting a first light from a first source coupled with a first printed circuit board;

reflecting, by a first light guide, the first light in a first direction;

emitting a second light from at least one second source coupled with a second printed circuit board;

reflecting, by a second light guide, the second light to a plurality of segments defined by a divider;

the second printed circuit board disposed between the first light guide and the second light guide;

controlling, by the second printed circuit board, the at least one second source to emit light via the plurality of segments to produce a linear display to indicate a status of one or more batteries of a vehicle;

the divider extends along the second light guide outward beyond an end surface of the second light guide in a direction towards a cover; and the cover having a first transparent portion, a second transparent portion, and an opaque portion coupled with and disposed between the first transparent portion and the second transparent portion.

10. The method of claim 9, comprising:

causing, by the first printed circuit board, the first source to emit the first light towards the first light guide to reflect the first light from the first source.

11. The method of claim 9, comprising:

causing, by the first printed circuit board, the first source to emit the first light in a second direction.

12. The method of claim 9, comprising:

the first light is configured to function as at least one of a daytime running light or a position light;

wherein the status of the one or more batteries of the vehicle is a charge status of the one or more batteries of the vehicle.

13. The method of claim 9, comprising:

the divider configured to at least partially block light between a first segment of the plurality of segments and a second segment of the plurality of segments.

14. The method of claim 9, comprising:

the first transparent portion and the second transparent portion of the cover interlocking with the opaque portion of the cover.

15. A vehicle, comprising:

a lighting apparatus, comprising:

a first light bar configured to display a first light from a first source to a first light guide, the first light guide configured to reflect the first light in a first direction from the first source, the first source coupled with a first printed circuit board; and a second light bar comprising:

a divider configured to define a plurality of segments of the second light bar; and a second light guide configured to reflect a second light in a second direction from at least one second source to the plurality of segments, the at least one second source coupled with a second printed circuit board;

a cover at least partially surrounding the divider and the second light guide, the cover having a first transparent portion, a second transparent portion, and an opaque portion coupled with and disposed between the first transparent portion and the second transparent portion to provide a patterned display of the second light;

the divider extends along the second light guide outward beyond an end surface of the second light guide in the second direction towards the cover;

the second printed circuit board disposed between the first light guide and the second light guide; and the second printed circuit board configured to:

control the at least one second source to emit the second light via the plurality of segments to produce a linear display to indicate a status of one or more batteries of the vehicle.

* * * * *